US008768505B2

(12) United States Patent
Thompson

(10) Patent No.: US 8,768,505 B2
(45) Date of Patent: Jul. 1, 2014

(54) SYSTEM AND METHOD FOR DISPENSING PRE-PAID ITEMS USING A UNIQUELY IDENTIFIED CONTAINER

(76) Inventor: Bryan Thompson, Gainesville, GA (US)

( * ) Notice: Subject to any disclaimer, the term of this patent is extended or adjusted under 35 U.S.C. 154(b) by 771 days.

(21) Appl. No.: 12/547,166

(22) Filed: Aug. 25, 2009

(65) Prior Publication Data
US 2011/0054678 A1 Mar. 3, 2011

(51) Int. Cl.
G06F 17/00 (2006.01)
G06K 9/00 (2006.01)
G06Q 30/06 (2012.01)

(52) U.S. Cl.
CPC ...................................... G06Q 30/06 (2013.01)
USPC ............ 700/237; 700/240; 700/236; 700/244

(58) Field of Classification Search
USPC .................................. 700/237, 236, 240, 244
See application file for complete search history.

(56) References Cited

U.S. PATENT DOCUMENTS

| 3,688,947 | A | * | 9/1972 | Reichenberger | 222/27 |
| 5,603,430 | A | * | 2/1997 | Loehrke et al. | 222/1 |
| 5,722,526 | A | | 3/1998 | Sharrard | |
| 5,911,515 | A | | 6/1999 | Allen et al. | |
| 6,263,446 | B1 | | 7/2001 | Kausik et al. | |
| 6,572,016 | B2 | * | 6/2003 | Saveliev et al. | 235/383 |
| 6,711,465 | B2 | | 3/2004 | Tomassi | |
| 6,759,072 | B1 | * | 7/2004 | Gutwein et al. | 426/433 |
| H2120 | H | | 7/2005 | Cuditz | |
| 7,032,818 | B2 | * | 4/2006 | Thomas et al. | 235/381 |
| 7,299,109 | B2 | * | 11/2007 | Juds et al. | 700/238 |
| 7,439,859 | B2 | * | 10/2008 | Humphrey | 340/572.1 |
| 7,455,867 | B1 | * | 11/2008 | Gutwein et al. | 426/594 |
| 7,483,766 | B1 | | 1/2009 | Frankel | |
| 7,483,862 | B1 | | 1/2009 | Robinson et al. | |
| 7,493,190 | B1 | | 2/2009 | Tomassi | |
| 7,845,375 | B2 | * | 12/2010 | Dorney | 141/94 |
| 7,899,713 | B2 | * | 3/2011 | Rothschild | 705/26.5 |
| 7,912,578 | B1 | * | 3/2011 | Frankel | 700/237 |
| 7,970,490 | B2 | * | 6/2011 | Fellows et al. | 700/235 |
| 8,164,454 | B2 | * | 4/2012 | Teller | 340/572.1 |
| 8,417,377 | B2 | * | 4/2013 | Rothschild | 700/233 |
| 8,504,395 | B2 | * | 8/2013 | Vago et al. | 705/5 |
| 2005/0087255 | A1 | * | 4/2005 | Humphrey et al. | 141/94 |
| 2005/0289058 | A1 | | 12/2005 | Hoffman et al. | |
| 2006/0190129 | A1 | * | 8/2006 | DeLine et al. | 700/232 |

(Continued)

OTHER PUBLICATIONS www.smugcoffee.com; web page printout; Copyright 2009; 5 pages.

*Primary Examiner* — Michael K Collins
(74) *Attorney, Agent, or Firm* — Gardner Groff Greenwald & Villanueva, P.C.

(57) ABSTRACT

A system and method for providing a pre-paid product using a unique container. The system comprises a computer system comprising a storage medium readable by a processing circuit and stored instructions for execution by the processing circuit. The computer system includes a sales module that acquires an identifier for the unique container and generates a credential ID for a customer. The sales module also activates the unique container, and stores the identifier for the unique container and the corresponding credential ID in the storage medium. Also included is a dispensing module that receives a request from a remote dispensing device for validation of the unique container to receive the prepaid product, compares a received identifier and a received credential ID with the identifier and the credential ID stored in the storage medium, and authorizes the dispensing of the prepaid product if they match.

25 Claims, 10 Drawing Sheets

(56) References Cited

U.S. PATENT DOCUMENTS

| | | |
|---|---|---|
| 2007/0093934 A1 | 4/2007 | Garneau, III |
| 2007/0215239 A1 | 9/2007 | Dorney |
| 2008/0103626 A1 | 5/2008 | Frankel |
| 2008/0195251 A1* | 8/2008 | Milner .......................... 700/237 |
| 2008/0195252 A1* | 8/2008 | Innocenti et al. .............. 700/240 |
| 2009/0001177 A1* | 1/2009 | Smith et al. .................... 235/494 |
| 2009/0040050 A1* | 2/2009 | Humphrey .................. 340/572.8 |
| 2010/0045705 A1* | 2/2010 | Vertegaal et al. .............. 345/661 |
| 2010/0108755 A1* | 5/2010 | Fuerstenberg et al. ........ 235/375 |
| 2010/0125362 A1* | 5/2010 | Canora et al. ................. 700/236 |
| 2011/0114647 A1* | 5/2011 | Hallberg .................. 220/592.17 |

* cited by examiner

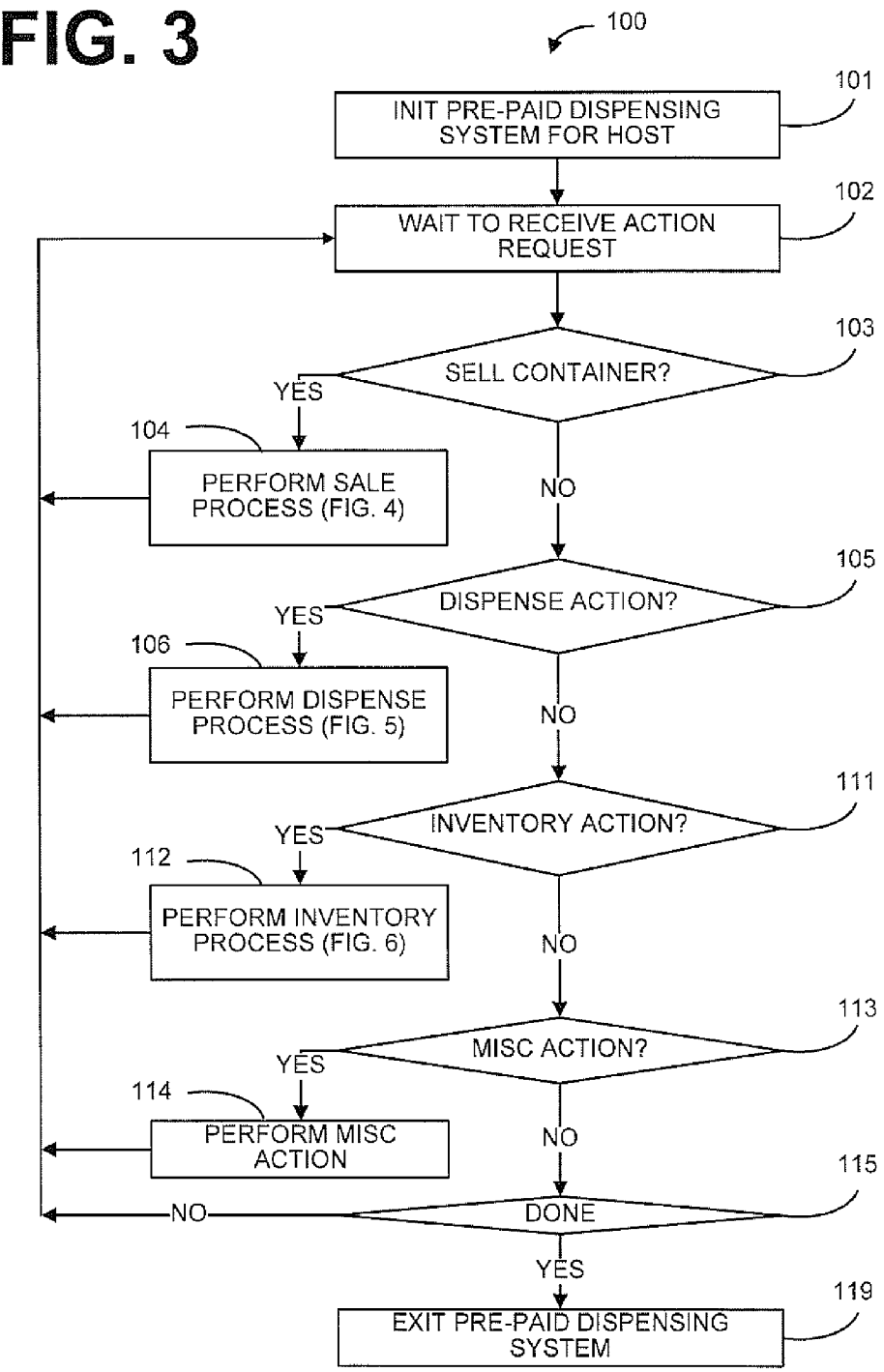

SYSTEM AND METHOD FOR DISPENSING PRE-PAID ITEMS USING A UNIQUELY IDENTIFIED CONTAINER

BACKGROUND OF THE INVENTION

1. Field of the Invention

The present invention generally relates to dispensing a product; and more particularly to a system and method of dispensing prepaid items using a uniquely identified container.

2. Description of Background

Currently, a typical method for dispensing food items, such as soft drinks, is to sell a generic container to a customer who can then fill it at a freestanding kiosk. This method does not insure that the customer will not allow others to use the authorized container for refills, or that only the authorized container is used. This method also does not insure that the container cannot be used beyond the period of time for which the sale was intended.

For systems that dispense items other than soft drinks, for example use of a company gas card at a company gas pump, existing schemes do not insure that the receiving container (usually a vehicle) is authorized. Such is the case for when a company gas card is utilized to fill the gas tank of a personal automobile.

SUMMARY OF THE INVENTION

The present invention relates to a system and method for dispensing prepaid items using a uniquely identified container. The system and method can be used for dispensing food items, such as beverages, into uniquely identifiable containers, such as cups, at a variety of locations or other events, such as amusement parks, carnivals, fairs, sporting events, concerts or other like locations and events where people gather long enough that multiple dispensing of an item may be desired.

Briefly described, in architecture, one embodiment of the system for providing a pre-paid product using a unique container, among others, can be implemented as follows. The system comprises a computer system including a storage medium readable by a processing circuit and storing instructions for execution by the processing circuit for providing validation of the uniquely identified container. The computer system further comprises a sales module that acquires a container ID for the unique container and generates a credential ID for a customer receiving the unique container. The sales module activates the unique container, and stores the container ID for the unique container and the corresponding credential ID in the storage medium. The computer system further comprises a dispensing module that receives a request from a remote dispensing device for validation of the unique container to receive the prepaid product, compares a received container ID and a received credential ID to the container ID and the credential ID stored in the storage medium and authorizes the dispensing of the prepaid product if they match.

In another aspect, the present invention relates to a method of providing a prepaid product from a remote dispensing station, where the remote dispensing station receives authorization to dispense the prepaid product from a computer system in communication with that remote dispensing station. The computer system comprises a storage medium readable by a processing circuit and storing instructions for execution by the processing circuit for performing the method. In this regard, one embodiment of such a method, among others, can be broadly summarized by the following steps: (1) processing a sales transaction for a container having a container ID and at least one condition of sale; (2) generating a credential ID that activates the container and is related only to the container; (3) saving in the storage medium the related container ID and credential ID, along with the at least one condition of sale; (4) saving in the storage medium the related container ID and credential ID, along with at least one condition of sale; (5) receiving a request to authorize the dispensing of the prepaid product into the container, wherein the request includes a request container ID and request credential ID; and (6) enabling the remote dispensing station to dispense the requested prepaid product into the container when the request container ID matches the container ID in the storage medium, the credential ID related to the container ID matches the request credential ID, and the condition of sale is met.

In yet another aspect, the present invention relates to a remote dispensing station comprising a storage medium readable by a processing circuit and storing instructions for execution by the processing circuit for providing validation of a uniquely identified container. The remote dispensing station comprises a plurality of products to be provided to a customer, a container ID reader that acquires a container ID of the uniquely identified container, and a credential ID reader that acquires a credential ID provided by the customer. The remote dispensing station further comprises a transceiver for transmitting the credential ID and container ID to a remote data system to request authorization to dispense one of the plurality of products and receiving the response to the request, and a dispenser to dispense one of the plurality of products into the uniquely identified container if the response to the request includes authorization to dispense one of the plurality of products.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are exemplary and explanatory of preferred embodiments of the invention, and are not restrictive of the invention, as claimed.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings, in which:

FIG. 3 is a flow chart illustrating an example of the operation of the pre-paid dispensing system of the present invention on the server, as shown in FIG. 2A.

Figure 1:
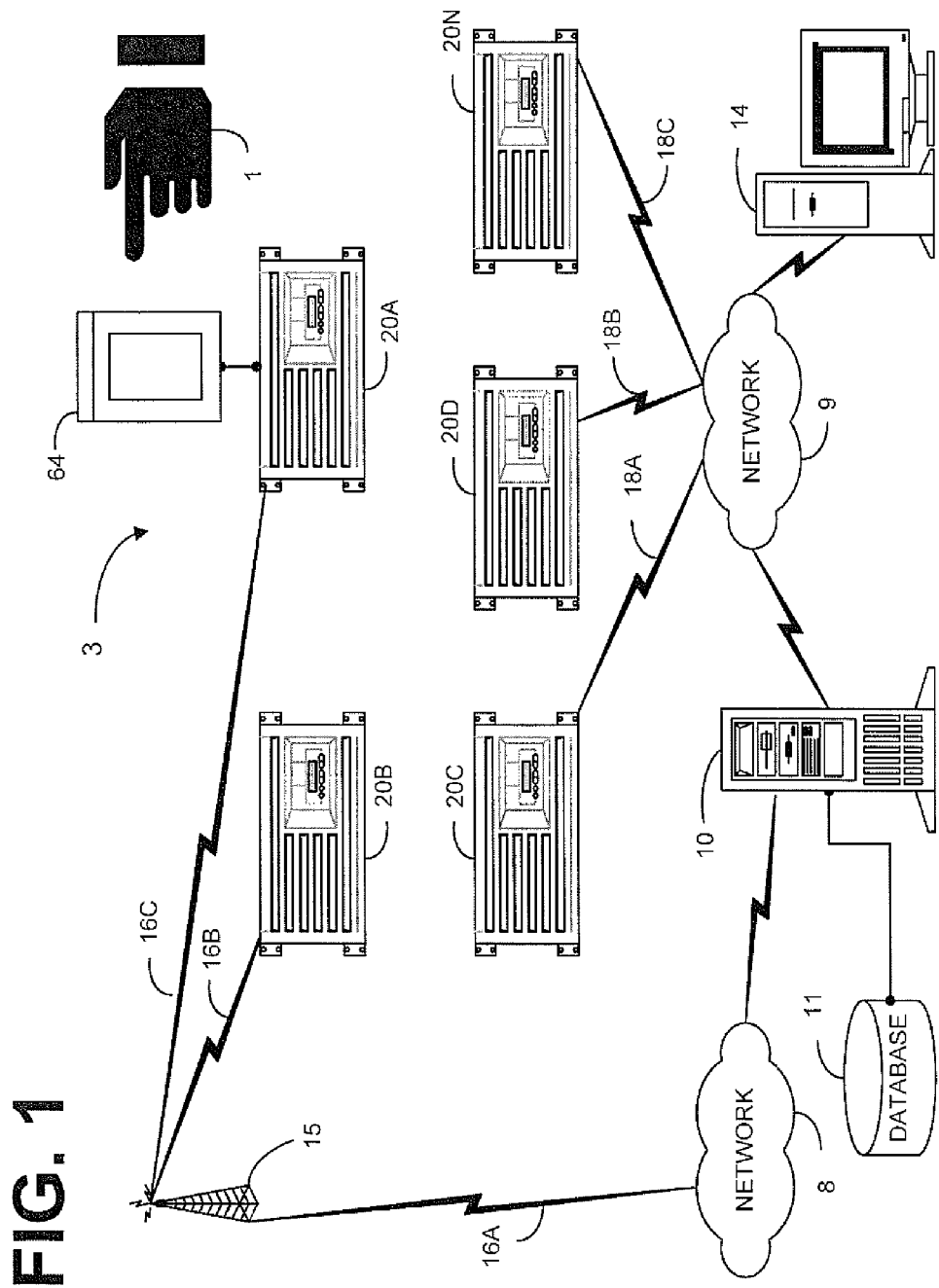
FIG. 1 is a block diagram illustrating an example of the network environment for the pre-paid dispensing system of the present invention.

The detailed description explains the preferred embodiments of the invention, together with advantages and features, by way of example with reference to the drawings.

DETAILED DESCRIPTION OF EXAMPLE EMBODIMENTS

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be unnecessarily limiting of the claimed invention The invention described hereafter is applicable on all remote dispensing devices connected to a server. While described below with respect to a client/server, the system and method for dispensing prepaid items using a uniquely identified container (e.g. container ID) is typically implemented in a networked computing environment in which a number of computing devices communicate over a network, such as but not limited to a local area network (LAN), a personal area network (PAN), a campus area network (CAN), a metropolitan area network (MAN), a wide area network (WAN) or a combination of any of the above.

The system and method for dispensing pre-paid items uses a uniquely identified container and a uniquely identified and separate credential ID to verify the pre-payment and to authorize dispensing the item (including an initial dispensing and refills of the same or related item). This provides many advantages for vendors that include, but are not limited to, the following. (1) A single transaction replaces multiple transactions. (2) Income is pulled ahead chronologically instead of being spread out over the time frame covered in the conditions of sale. (3) A few strategically placed unmanned dispensing stations can replace multiple manned stations, reducing labor costs and reducing equipment costs. (4) The number and thus the cost overall of disposable containers is reduced by each refill using the uniquely identified container instead of each dispensing requiring a new generic container. (5) The cost of trash disposal is reduced since the customer keeps a re-useable container instead of generating multiple containers for disposal. (6) The vendor may choose to provide access to the dispensing system at reduced costs as a promotional feature to entice customers into purchasing season tickets or other premium services. (7) The vendor may track marketing metrics on their customers from the dispensing stations. For example, if the details of customer's sex and approximate age (e.g. child, youth, adult) are entered into a database along with the container ID and secondary ID, the vendor can then group this information for analysis of product preference, amount dispensed as a function of time of day, and total amount dispensed for each group. (8) If a RFID chip is used as the container ID, the vendor may be able to use this for tracking the customer's attendance at various locations on vendor's property, allowing for analysis and metrics useful for planning and marketing.

Advantages to the customer include, but are not limited to, the following. (1) A single transaction replaces multiple transactions, allowing for better budgeting of costs. (2) In the case of a parent purchasing a container for a minor, the minor need not carry money to purchase refills. (3) Less time is wasted standing in line waiting for a clerk to make a transaction, as refills are made at remote unmanned dispensing stations. (4) If the customer has a child and wishes to prohibit purchases by the child of certain dispensed items available from the choices at a dispensing station, then those items can be blocked as part of the conditions of sale and the dispensing station is prevented from dispensing those items to the child's container. (5) Depending on the conditions of sale, the customer may be allowed to renew the container and conditions of sale at a future date without having to purchase another uniquely identifiable container.

In an alternative embodiment, more advantages include the benefits to a company owner who uses the pre-paid dispensing system of the present invention to control dispensing of company items into company-authorized containers. For example, company or government owned gas pumps can be adapted to dispense fuel only to authorized vehicles that have access to that proprietary gas pump. In this way, the company gains assurance that only authorized persons and authorized containers (e.g. vehicles, gas tanks and the like) are used. Moreover, the company gains data and records of the fueling transactions.

In another alternative embodiment, the system can be adapted for the military's dispensing of ammunition to soldiers (whose weapon is the "container"). This could help provide security for the ammunition and tracking of who received ammunition.

In still another alternative embodiment, the system can be adapted for the dispensing of restricted data electronically to uniquely identifiable data storage devices. This would be a great advantage for regulation of USB storage devices, which provide a very easy means to copy and covertly withdraw restricted data.

A system and method for a pre-paid dispensing system according to an example embodiment of the present invention generally operates as such. First, a container is manufactured with a unique identifying feature, e.g. a container ID. Examples of this container ID information include, but are not limited to, container ID information which may be permanently encoded or capable of being re-encoded. The container ID may be an optical ID (e.g., barcode, hologram, pictogram, printed code, holes or depressions in the container), an electronic ID (e.g., RFID or radio tag "chip", magnetic chip or strip), a feature in the container readable electronically (e.g., electrical resistance or capacitance), a tactile encoded ID (e.g. holes or depressions in the container, any kind of surface features such as bumps, lines, or etchings), or the like. The container manufacturer sends electronic signals to a vendor's server computer (e.g., by email, FTP, on a disk accompanying the shipment or the like). The electronic signal is representative of the container ID for each container shipped to the vendor.

A customer then purchases the container and conditions of the sale are set. Conditions of the sale include, but are not limited to, the duration for which the container may be filled, the minimum time (e.g. in minutes) between fillings of the container, the locations where the container may be filled and selection limitations of the filler product. At the time of sale, the container is processed at the point-of-sale station so that the container ID may be captured. The vendor's server computer then verifies that the container is a registered container by comparing the captured container ID with the information received in the electronic signal. At this point, the customer's credential ID is also captured at the point-of-sale station. Examples of the customer's credential ID include, but are not limited to, a biometric reading, magnetic encoding on an object, a key code that can be punched into a keypad, an optically scannable object, a digitally encoded electronic key, a mechanical item such as a key and the like. Examples of biometric readings include, but are not limited to, a fingerprint scan, facial recognition, voice recognition, retinal scan, and/or the like. Examples of optically scanned objects include, but are not limited to, a card or item with coding holes punched in it; a barcode, number or other printed identifier; a hologram; and/or the like.

At this time, the vendor's server computer links the credential ID to the container, container ID and conditions of sale to "activate" the container. Once the container is activated, the customer can take the container to a dispensing kiosk, select a desired product, and present their credential ID. The dispensing kiosk then acquires the container ID and credential ID, and sends this information, along with the identity of the selected product, to the vendor's server computer.

The vendor's server computer then verifies that the container, container ID and credential ID are active and valid. The vendor's server computer validates the conditions of sale and location of sale. If the verification of the container ID, credential ID and conditions of sale are met, then the server computer sends a message to the dispensing kiosk along with a message for the customer of the result of the authorization. In those cases where the authorization is valid, then the server computer authorizes the dispensing kiosk to dispense the selected product. The server computer then documents the transaction for future consideration of the conditions of sale. In the cases where the authorization is invalid (e.g. condition of sale conditions are not met or the container ID and credential ID are not correctly matched), the server computer sends a message to the dispensing kiosk denying the transaction and a message for display by the kiosk to the customer explaining the conditions of the denied transaction. In one embodiment, the message comprises a flag indicating whether the transaction is valid or invalid, and a text message for display to the customer. In another embodiment, the message includes an encoded signal that indicates whether the transaction is valid or invalid and which if any predetermined text message is to be displayed to the customer.

In the preferred environment, the products selected are soft drinks or other beverages, such as sodas, root beer, ginger ale, lemonade, juice, tea, coffee, and the like. In an alternative embodiment, the products selected can include granular items such as popcorn, nuts, granola, raisins and the like. In still another alternative embodiment, the products selected include semi-liquids, such as ice cream, suntan lotion, skin moisturizing cream, hand sanitizer, and the like. In still another embodiment, the selected products could be a fluid, such as gasoline, perfume, cologne and the like. In yet another alternative embodiment, the products selected could be alcoholic beverages, such as beer, wine, hard liquor (e.g., whiskey, rye, scotch, gin, vodka, rum, tequila), a mixer and/or the like.

FIG. 1 illustrates an example of the basic components of a pre-paid dispensing system 3 according to a preferred embodiment of the present invention. The system 3 includes a server 10 that utilizes the prepaid dispensing method and a plurality of remote dispensing devices 20(A-N) that utilize the remote pre-paid dispensing method of the present invention.

Each remote dispensing device 20(A-N) has applications and means to capture the customer's credential ID. Server 10 contains applications and a database 11 that can be accessed by the remote dispensing devices 20(A-N) via one or more connections such as 16(A-C) and 18(A-C), respectively, over one or more networks such as 8 and 9. The server 10 runs administrative software for a computer network and controls access to itself and database 11. The remote dispensing devices 20(A-N) may access the database 11 over networks 8 and 9, such as but not limited to, a local area network (LAN), a personal area network (PAN), a campus area network (CAN), a metropolitan area network (MAN), a wide area network (WAN) or a combination of any of the above. These networks may include but are not limited to the Internet, a telephone line using a modem (POTS), Bluetooth, WiFi, cellular, optical, satellite, RF, Ethernet, magnetic induction, coax, RS-485, and/or other like networks.

The remote dispensing devices 20(A-N) may each be located at remote sites. Remote dispensing devices 20(A-N) each include a remote product dispenser and remote computer device that includes, but is not limited to, a PLC, PC, workstation, laptop, handheld computer, pocket PC, PDA, pager, WAP device, non-WAP device, cell phone, palm device, printing device and/or the like. Included with each remote dispensing device 20(A-N) is an input device such as a reader for obtaining the customer's credential ID. In the remote dispensing device 20B, for example, there is a fingerprint scanner 64 for capturing fingerprints to determine the biometric identity of customer 1. The other remote dispensing devices 20A, 20(C-E) also have integrated cameras or other scanning equipment for acquiring the customer's credential ID. The credential readers are typically of the same type for every remote dispensing device 20(A-N) in particular system, and are selected for acquiring the type of credential ID used in a particular system.

Thus, when a user at one of the remote dispensing devices 20(A-N) desires to have a product dispensed into their container, they presents their credential ID to the input device (e.g., by positioning their finger on the fingerprint scanner 64). The remote dispensing device 20(A-N) then communicates the acquired credential ID over the network 8 or 9 to server 10 and database 11.

Third party supplier computer systems 14 and databases (not shown) can be accessed by the pre-paid dispensing system on server 10 in order to access product offerings and ordered products. Data that is obtained from third party supplier computer system 14 and database can be stored on server 10 and database 11 in order to provide later access to the remote dispensing devices 20(A-N). It is also contemplated that for certain types of data, the remote dispensing devices 20(A-N) can access the third party supplier computer systems 14 and database directly using the network 9. Third-party suppliers include but are not limited to the product being dispensed, items associated with the product being dispensed and/or the like. In the preferred environment, the products selected are soft drinks or other beverages, such as sodas, root beer, ginger ale, lemonade, juice, tea, coffee, and the like. In an alternative embodiment, the products selected can include granular items such as popcorn, nuts, granola, raisins and the like. In still another alternative embodiment, the products selected include semi-liquids, such as ice cream, suntan lotion, skin moisturizing cream, hand sanitizer, and the like. In still another embodiment, the selected products could be a fluid, such as gasoline, perfume, cologne and the like. In yet another alternative embodiment, the products selected could be alcoholic beverages, such as beer, wine, hard liquor (e.g., whiskey, rye, scotch, gin, vodka, rum, tequila), a mixer and/or the like. Examples of items associated with the product include but are not limited to, straws, napkins, and/or the like.

Figure 2A:
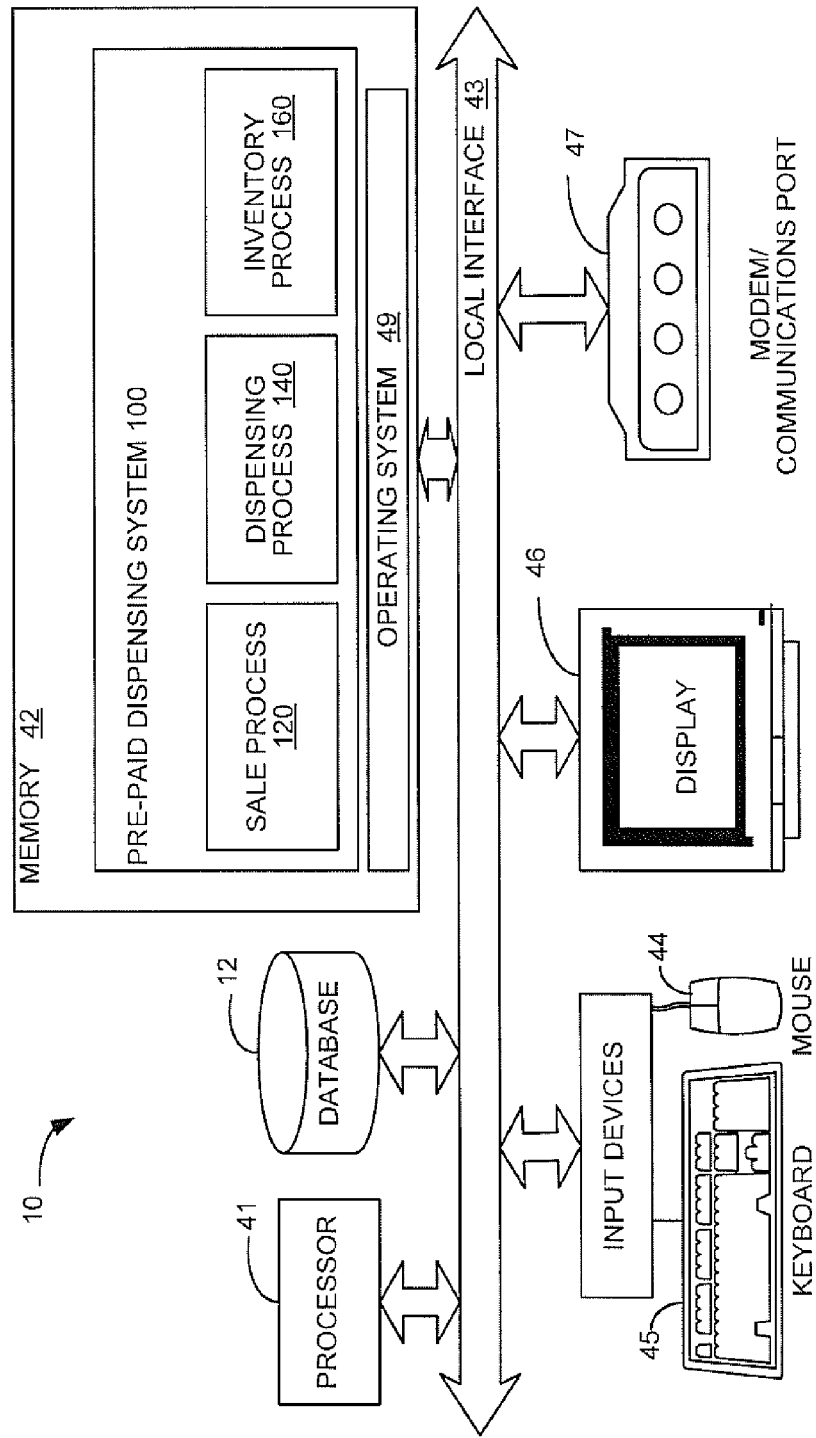
FIG. 2A is a block diagram illustrating an example of a server for the pre-paid dispensing system of the present invention, as shown in FIG. 1.
Figure 2B:
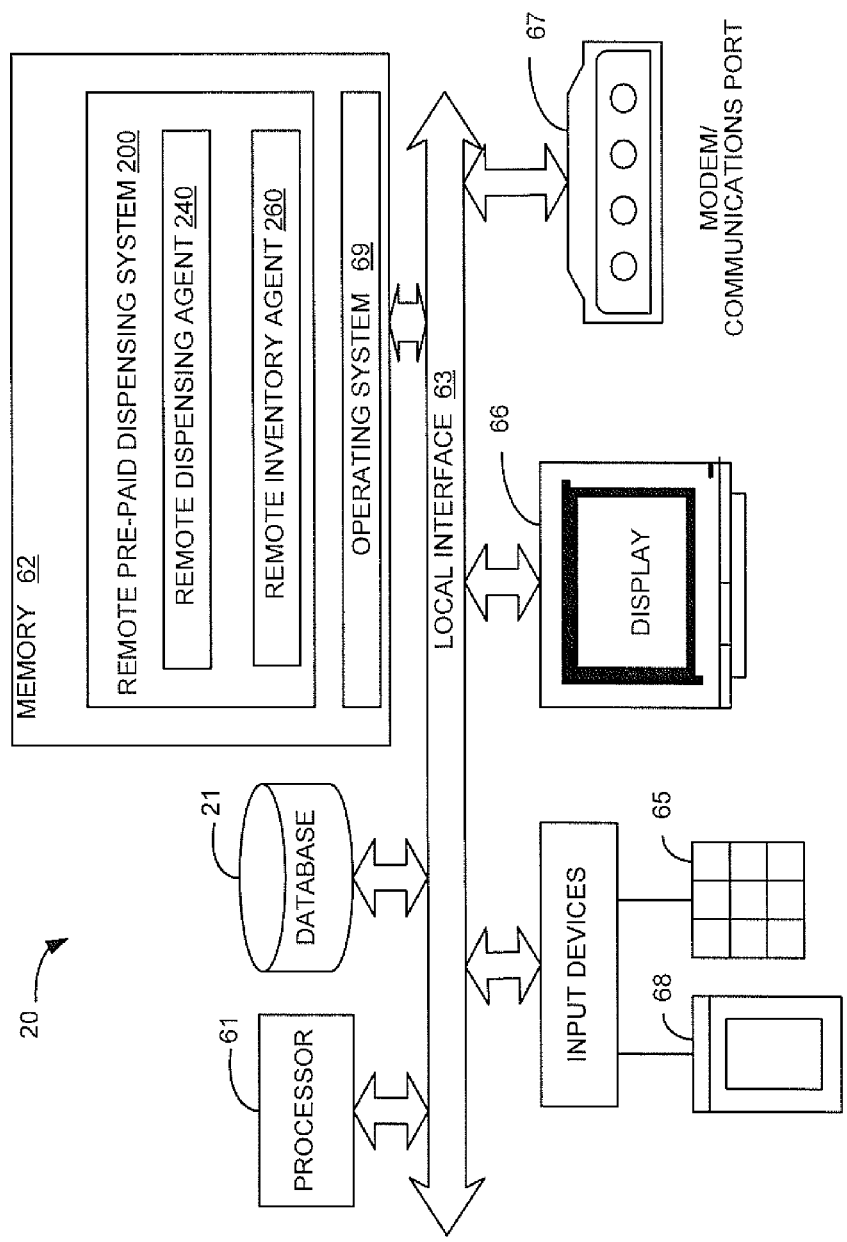
FIG. 2B is a block diagram illustrating an example of a remote dispensing device for the remote pre-paid dispensing system, as shown in FIG. 1.

Illustrated in FIG. 2A is a block diagram demonstrating an example of server 10, as shown in FIG. 1, with the pre-paid dispensing system 100 of the present invention. Examples of server 10 include, but are not limited to, PCs, workstations, laptops, PDAs, palm devices and the like. Illustrated in FIG. 2B is an example demonstrating the remote dispensing devices 20(A-N) with the remote pre-paid dispensing system 200 of the present invention. The processing components of the third party supplier computer systems 14 are similar to that of the description for the server 10 (FIG. 2A).

Generally, in terms of hardware architecture, as shown in FIG. 2A, the server 10 includes a processor 41, memory 42, and one or more input and/or output (I/O) devices (or peripherals) that are communicatively coupled via a local interface 43. The local interface 43 can be, for example, one or more buses or other wired or wireless connections, as are known in the art. The local interface 43 may have additional elements, which are omitted for simplicity, such as controllers, buffers (caches), drivers, repeaters, and/or receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom-made or commercially available processor, a central processing unit (CPU), a data signal processor (DSP) or an auxiliary processor among several processors associated with the server 10, or a semiconductor-based microprocessor (in the form of a microchip) or a macroprocessor. Examples of suitable commercially available microprocessors include, but are not limited to, the following: an 80×86 or Pentium® series microprocessor from Intel® Corporation, U.S.A., a PowerPC® microprocessor from IBM®, U.S.A., a Sparc™ microprocessor from Sun Microsystems®, Inc., a PA-RISC™ series microprocessor from Hewlett-Packard Company®, U.S.A., a 68xxx series microprocessor from Motorola Corporation®, U.S.A. or a Phenom™, Athlon™Sempron™ or Opteron™ microprocessor from Advanced Micro Devices®, U.S.A.

The memory 42 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2A, the software in the memory 42 includes a suitable operating system (O/S) 49 and the pre-paid dispensing system 100 of the present invention. As illustrated, the pre-paid dispensing system 100 of the present invention comprises numerous functional components including, but not limited to, the sale process 120, dispensing process 140 and inventory process 160.

A non-exhaustive list of examples of suitable commercially available operating systems 49 is as follows (a) a Windows/Vista operating system available from Microsoft Corporation; (b) a Netware operating system available from Novell, Inc.; (c) a Macintosh/OS X operating system available from Apple Computer, Inc.; (e) an UNIX operating system, which is available for purchase from many vendors, such as but not limited to the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (such as for example Symbian OS available from Symbian, Inc., PalmOS available from Palm Computing, Inc., and Windows CE available from Microsoft Corporation).

The operating system 49 essentially controls the execution of other computer programs, such as the pre-paid dispensing system 100, and provides scheduling, input-output control, file and data management, memory management, and communication control and related services. However, it is contemplated by the inventors that the pre-paid dispensing system 100 of the present invention is applicable on all other commercially available operating systems.

The pre-paid dispensing system 100 may be a source program, executable program (object code), script, or any other entity comprising a set of instructions to be performed. When a source program, then the program is usually translated via a compiler, assembler, interpreter, or the like, which may or may not be included within the memory 42, so as to operate properly in connection with the O/S 49. Furthermore, the pre-paid dispensing system 100 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote dispensing devices, other files, devices, systems, or a network), a radio frequency (RF) or other transceiver (not shown), a telephonic interface (not shown), a bridge (not shown), a router (not shown), and/or the like.

If the server 10 is a PC, workstation, intelligent device or the like, the software in the memory 42 may further include a basic input output system (BIOS) (omitted for simplicity). The BIOS is a set of essential software routines that initialize and test hardware at startup, start the O/S 49, and support the transfer of data among the hardware devices. The BIOS is stored in some type of read-only memory, such as ROM, PROM, EPROM, EEPROM or the like, so that the BIOS can be executed when the server 10 is activated.

When the server 10 is in operation, the processor 41 is configured to execute software instructions stored within the memory 42, to communicate data to and from the memory 42, and generally to control operations of the server 10 pursuant to the software. The pre-paid dispensing system 100 and the O/S 49 instructions are read, in whole or in part, by the processor 41, perhaps buffered within the processor 41, and then executed.

When the pre-paid dispensing system 100 is implemented in software, as is shown in FIG. 2A, it should be noted that the pre-paid dispensing system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

In an alternative embodiment, where the pre-paid dispensing system 100 is implemented in hardware, the pre-paid dispensing system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Illustrated in FIG. 2B is a block diagram demonstrating an example of functional elements in the remote dispensing devices 20(A-N) that enable access to the pre-paid dispensing system 100 of the present invention, as shown in FIG. 2A. The remote dispensing devices 20(A-N) provide access to preselected products at unmanned locations upon authorization to dispense the products, which authorization is obtained by accessing information in server 10 and database 11. This information can be provided in a number of different forms including, but not limited to, ASCII data, WEB page data (e.g. HTML), XML or other type of formatted data.

Included with each remote dispensing device 20(A-N) is an input device such as a reader for obtaining the credential ID of the customer 1. In the remote dispensing device 20B, there is a fingerprint scanner 68 for capturing fingerprints to determine the biometric identity of customer 1. Alternatively, the reader can be selected to capture images such as facial recognition images, retinal images or images to provide skin texture analysis. In remote dispensing devices 20A, 20(C-E), there are either integrated fingerprint scanners 64 for acquiring fingerprint images of the client, optical scanners (not shown) for acquiring coded key punches, barcodes or other printed identifier, a holograms or the like, a keypad 65 to obtain key codes, a magnetic card reader (not shown) for magnetic stripe reading or the like.

The software in memory 62 may include one or more separate programs, each of which comprises an ordered listing of executable instructions for implementing logical functions. In the example illustrated in FIG. 2B, the software in the memory 62 includes a suitable operating system (O/S) 69 and the remote pre-paid dispensing system 200 of the present invention. As illustrated, the remote pre-paid dispensing system 200 of the present invention comprises numerous functional components including, but not limited to, remote dispensing agent 240 and remote inventory agent 260.

As illustrated, the remote dispensing devices 20(A-N) each include components that are similar to components for server 10 described with regard to FIG. 2A. Hereinafter, the remote dispensing devices 20(A-N) will be referred to as the remote dispensing device 20 for the sake of brevity.

FIG. 3 is a flow chart illustrating an example of the operation of the pre-paid dispensing system 100 on server 10, as shown in FIG. 2A. The pre-paid dispensing system 100 of the present invention provides a paid vendor with the ability to use a uniquely identified container and a uniquely identified and separate credential ID to verify the pre-payment and to authorize dispensing of an item (including an initial dispensing and refills of the same or a related item).

First at step 101, the pre-paid dispensing system 100 is initialized on server 10. This initialization includes the startup routines and processes embedded in the BIOS of the server 10. The initialization also includes the establishment of data values for particular data structures utilized in the pre-paid dispensing system 100.

At step 102, the pre-paid dispensing system 100 waits to receive an action request. Once an action is received at step 102, it is determined if the action is to sell a uniquely identified container at step 103. If it is determined that the action is not to sell a uniquely identified container, then the pre-paid dispensing system 100 skips to step 105. However, if it is determined in step 103 that a sale of the uniquely identified container is to occur, then the pre-paid dispensing system 100 performs the sale process at step 104. The sale process is herein defined in further detail with regard to FIG. 4. After performing the sale process, the pre-paid dispensing system 100 returns to step 102.

At step 105, it is determined if the action is a dispense action. A dispense action is the verification of the authorization of the remote dispensing device 20 to dispense the requested product. If it is determined that the action is not a dispense action, then the pre-paid dispensing system 100 skips to step 111. However, if it is determined in step 105 that it is a dispense action, then the pre-paid dispensing system 100 performs the dispensing process at step 106. The dispensing process is herein defined in further detail with regard to FIG. 5. After performing the dispensing process, the pre-paid dispensing system 100 returns to step 102.

At step 111, it is determined if the action is an inventory action, e.g. a unique container or product ordering action. If it is determined that the action is not an inventory action, then the pre-paid dispensing system 100 skips to step 113. However, if it is determined at step 111 that it is an inventory action, then the pre-paid dispensing system 100 performs the inventory process at step 112. The inventory process is herein defined in further detail with regard to FIG. 6. After performing the inventory process, the pre-paid dispensing system 100 returns to step 102.

At step 113, it is determined if the action is a miscellaneous action. A miscellaneous action is a situation where the server 10 performs an action not pertinent to the pre-paid dispensing system 100 of the present invention. If it is determined that the action is not a miscellaneous action, then the pre-paid dispensing system 100 skips to step 115. However, if it is determined at step 113 that a miscellaneous action is to be performed, then the pre-paid dispensing system 100 performs the miscellaneous action at step 114. After performing the miscellaneous action, the pre-paid dispensing system 100 returns to step 102.

At step 115, it is determined if the pre-paid dispensing system 100 is to wait for an additional action request. If it is determined at step 115 that the pre-paid dispensing system is to wait to receive additional actions, then the pre-paid dispensing system 100 returns to repeat steps 102 through 115. However, if it is determined at step 115 that there are no more actions to be received, then the pre-paid dispensing system 100 then exits at step 119.

Figure 4:
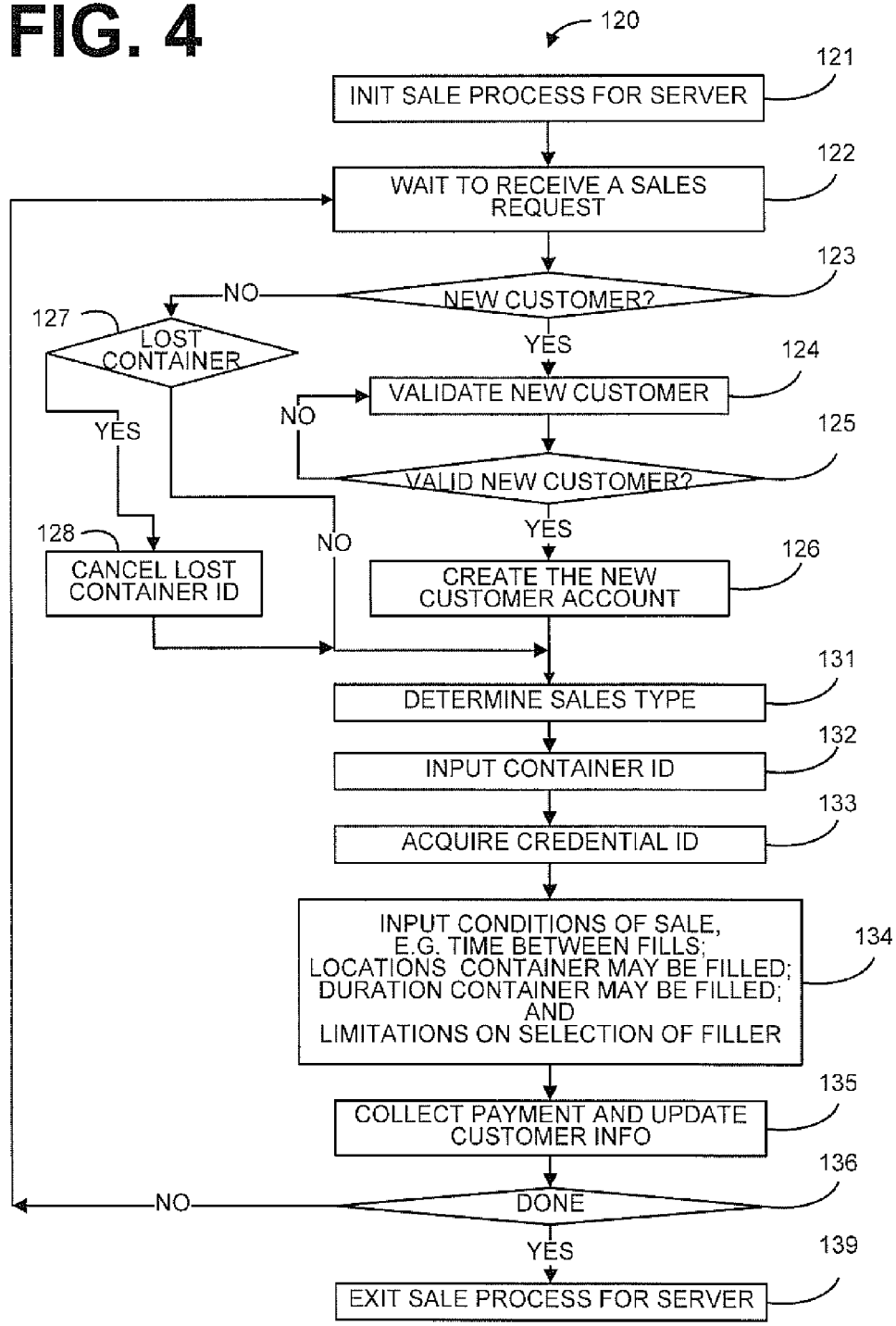
FIG. 4 is a flow chart illustrating an example of the operation of the sale process of the pre-paid dispensing system of the present invention, as shown in FIGS. 2A & 3.

FIG. 4 is a flow chart illustrating an example of the operation of the sale process 120 of the pre-paid dispensing system 100 on the server 10, as shown in FIGS. 2A & 3. The sale process 120 establishes or modifies client-specific information residing on database 11 (FIG. 2A). Once the client information is acquired by sale process 120, it is available for acquiring the container ID, credential ID and conditions of sale for the unique container purchase.

First at step 121, the sale process 120 is initialized. This initialization includes the startup routines and processes embedded in the BIOS of the server 10. The initialization also includes the establishment of data values for particular data structures utilized in the sale process 120.

At step 122, the sale process 120 waits to receive a sales request. Once a sales request has been received, the sale process 120 determines if the customer is a new customer to the pre-paid dispensing system 100. If it is determined at step 123 that the customer is not a new customer, then the sale process 120 skips to step 127 to determine if the customer has lost their unique container. However, if it is determined at step 123 that the customer is a new customer, then the sale process 120 validates the new customer at step 124. The new customer is registered at this time and is validated against information in database 11 at step 125. This validation includes validating the new customer against the database 12 for customers that are banned from use of the pre-paid dispensing system 100. If the new customer is not valid, then the sale process 120 returns to step 124. However, if the new customer is valid, then the sale process 120 enables the new customer to create a new customer account at step 126. Various types of information may be captured for each new customer, for example, the customer's gender and approximate age (e.g. child, youth, adult), which is entered into a database. The vendor can then group this information for analysis of product preference, amount dispensed as a function of time of day, and total amount dispensed for each group. The sale process 120 then skips to step 131.

At step 127, the sale process 120 determines if the customer has lost their unique container. If it is determined at step 127 that the existing client has not lost their unique container, then the sale process 120 proceeds to step 131. However, if it is determined at step 127 that the customer has lost their unique container, then the sale process 120 invalidates the lost container ID from database 11 at step 128.

At step 131, it is determined what type of sale is to be provided for the customer. If it is determined that a new unique container is to be purchased, then the sale process 120 saves the information indicating that the sales type is a new sale in database 11. However, if it is determined in step 131 that the sales type is a replacement of a lost unique container, then that data is also saved in database 11. The third type of sales transaction is where the original sales conditions have expired and a new duration is purchased using the same container, container ID and credential ID.

At step 132, the container ID is acquired and saved to database 11. As noted above, a new unique container will have a new unique container ID for a new sale or a replacement sale. A duration extension transaction will utilize the container ID previously captured. Examples of this container ID information include, but are not limited to, container ID information which may be permanently encoded or capable of being re-encoded. The container ID is read via a "reader" that scans the container. This scan may be for optical ID (e.g., barcode, hologram, pictogram, printed code, holes or depressions in the container), an electronic ID (e.g., RFID or radio tag "chip", magnetic chip or strip), a feature in the container readable electronically (e.g., electrical resistance or capacitance), or a tactile encoded ID (e.g., holes or depressions in the container, any kind of surface features such as bumps, lines, or etchings) and/or the like.

At step 133, the credential ID is acquired and saved to database 11. A new sale transaction type will have the credential ID determined for the customer. In the case of a replacement (of a lost container) sales transaction or a duration extension transaction, the sale process 120 enables the customer to utilize the same credential ID as previously used. Examples of the customer's credential ID include, but are not limited to, a biometric reading, magnetic encoding on an object, a key code that can be punched into a keypad, an optically scalable object, a digitally encoded electronic key, a mechanical item such as a key and/or the like. Examples of the biometric reading include, but are not limited to, a fingerprint scan, facial recognition, retinal scan, and/or the like. Examples of the optically scanned object include, but are not limited to a card or other item with coding holes punched in it; a barcode, number or other printed indentifier; a hologram; and/or the like.

At step 134, the conditions of sale (also referred to as the "conditions of use") are acquired. Examples of the conditions of sale include, but are not limited to, minimum time between refills, location where the container may be filled, the time duration in which the container may be filled and limitations on the selected product. There are predetermined conditions for each one of the above conditions of sale that are modifiable at the time of sale. For example, the default time between refills may be set at 30 minutes, but if a higher level of service is purchased, the minimum time between refills can be reduced to 5, 10, 15 or 20 minutes. The locations where the container may be filled can be limited to certain geographical areas by default, but can be expanded to additional geographic areas if a higher level of service is purchased. The duration for which the container may be filled can be limited to a day, a couple of days, all week, weekends, a month or a calendar year. Say for instance the default value is for just a day, then a higher level of service may be purchased to extend the time period that the container would be valid. Conditions of sale for the product selection are provided for example in case a parent purchasing a container for a child, wishes to limit the selection that the child may make. In that case, the parent could identify the exact products that are enabled for the child to receive for that unique container, container ID and credential ID. Thus, a parent could select conditions of sale that prevent her child from dispensing sugared beverages.

In the case of company cars and company operated gas pumps, the conditions of sale may include linking an individual's credential ID to one or more vehicles. In the case of ammunition dispensing stations for police and/or military, the "conditions of sale" (note that in this case the pre-approval is not actually a "sale") may include the specific ammunition type authorized.

At step 135, the customer information is updated on database 11. The sale process 120 links credential ID to container, container ID and conditions of sale in the customer's account on database 11. Also at this time, the cost of the transaction is computed and presented to the customer for payment. The payment type is part of the information captured during the validation of the new customer account at step 125.

At step 136, it is determined if the sale process 120 is to wait for additional customer requests. If it is determined at step 136 that the sale process 120 is to wait for additional customer requests, then the sale process 120 returns to repeat steps 122 through 136. However, if it is determined at step 136 that there are no more customer requests to be received, then the sale process 120 exits at step 139.

Figure 5:
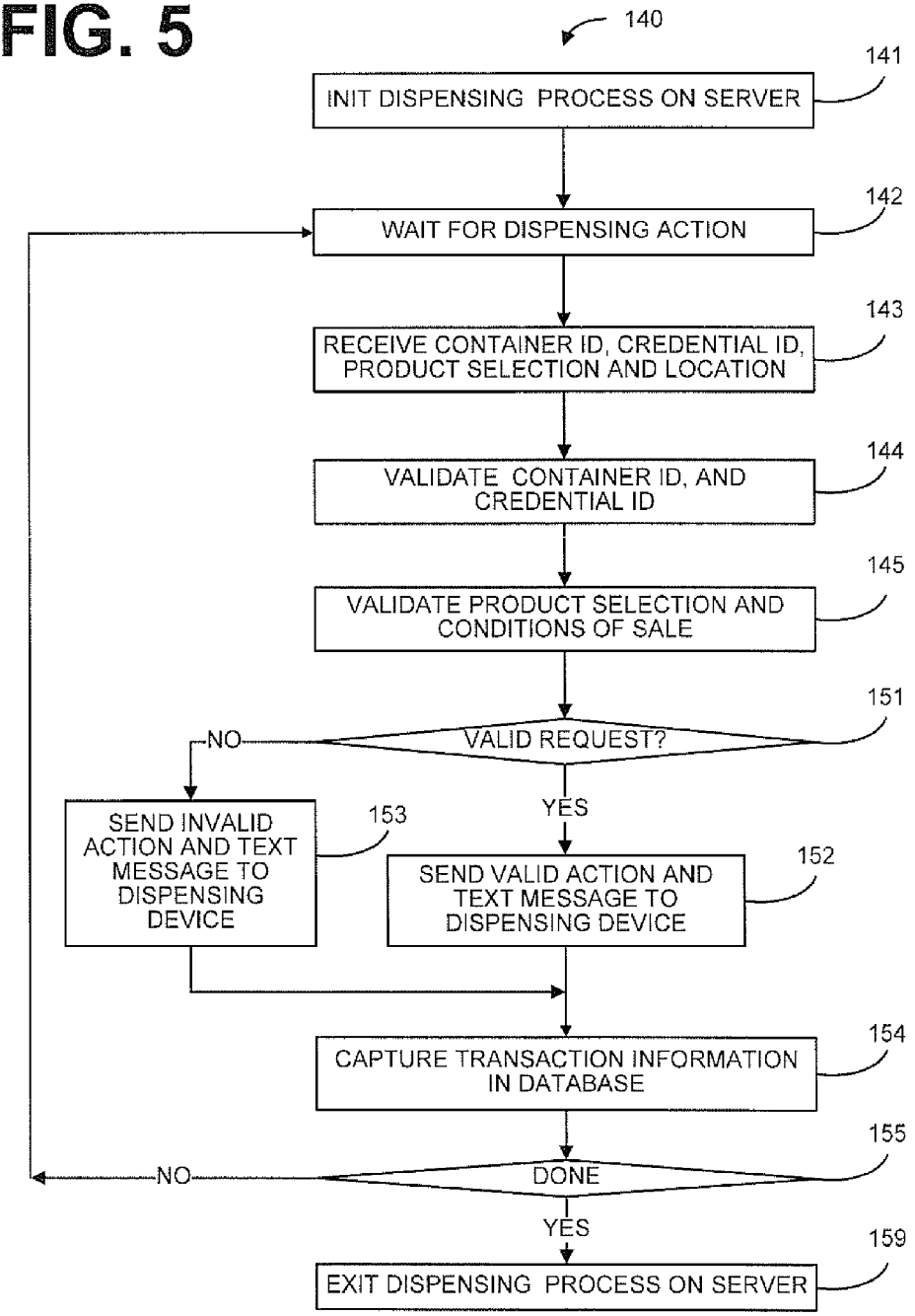
FIG. 5 is a flow chart illustrating an example of the operation of the dispensing process of the pre-paid dispensing system of the present invention, as shown in FIGS. 2A & 3.

FIG. 5 is a flow chart illustrating an example of the operation of the dispensing process 140 of the pre-paid dispensing system 100 on the server 10 as shown in FIGS. 2A & 3. Once the new customer is placed in the pre-paid dispensing system 100, they are available for receiving a product from a remote dispensing device 20.

First at step 141, the dispensing process 140 is initialized. This initialization includes the startup routines and processes embedded in the BIOS of the server 10. The initialization also includes the establishment of data values for particular data structures utilized in the dispensing process 140.

At step 142, the dispensing process 140 waits to receive a dispensing transaction. Once a dispensing transaction has been received, the dispensing process 140 then receives the container ID information, credential ID, product selection and the location of the remote dispensing device 20 at step 143. At step 144, the dispensing process 140 validates the container ID and credential ID This validation is made by accessing and comparing against the information in database 11 to ensure that the container, container ID and credential ID are active, still valid and that the conditions of sale are met.

At step 145, the dispensing process 140 validates the product selection and other conditions of sale. This is to verify that all of the conditions of sale originally agreed to are in effect. Examples of the conditions of sale include, but are not limited to, minimum time between refills, location where the container may be filled, the time duration in which the container may be filled and limitations on the selected product. There are predetermined conditions for each one of the above conditions of sale that are modifiable at the time of sale. For example, the default time between refills may be limited to 30 minutes, but if a higher level of service is purchased, the minimum time between refills can be reduced to 5, 10, 15 or 20 minutes. The locations where the container may be filled can be limited to certain geographical areas by default, but can be expanded to additional geographic areas if a higher level of service is purchased. The duration for which the container may be filled can be limited to a day, a couple of days, all week, weekends, a month or a calendar year. Say for instance the default value is for just a day, then a higher level of service may be purchased to extend the time period that the container would be valid. Conditions of sale for the product selection are provided, for example, in case a parent purchasing a container for a child wishes to limit the selection that the child may make. In that case, the parent could identify the exact products that are enabled for the child to receive for that unique container, container ID and credential ID.

At step 151, the dispensing process 140 determines if the product request is valid. If the verification of the container ID, credential ID and conditions of sale are met, then the server 10 sends a message to the remote dispensing device 20 along with a message for the customer of the result of the authorization. In those cases where the authorization is valid, then the server 10 authorizes the remote dispensing device 20 to dispense the selected product and display a notice to the customer of the authorization to dispense the product at step 152. In the cases where the authorization is invalid (e.g. sale conditions are not met, or the container ID and credential ID are not correctly matched), then the pre-paid dispensing system 100 on server 10 sends a message to the remote dispensing device 20 at step 153. The message sent to remote dispensing device 20 denies the transaction, and a message is displayed to the customer explaining the conditions of the denied transaction. At step 154, the dispensing process 140 documents the transaction for future consideration of the conditions of sale.

At step 155, it is determined if the dispensing process 140 is to wait for additional customer transactions. If it is determined at step 155 that the dispensing process 140 is to wait for additional customer transactions, then the dispensing process 140 returns to repeat steps 142 through 155. However, if it is determined at step 155 that there are no more customer transactions to be received, then the dispensing process 140 exits at step 159.

Figure 6:
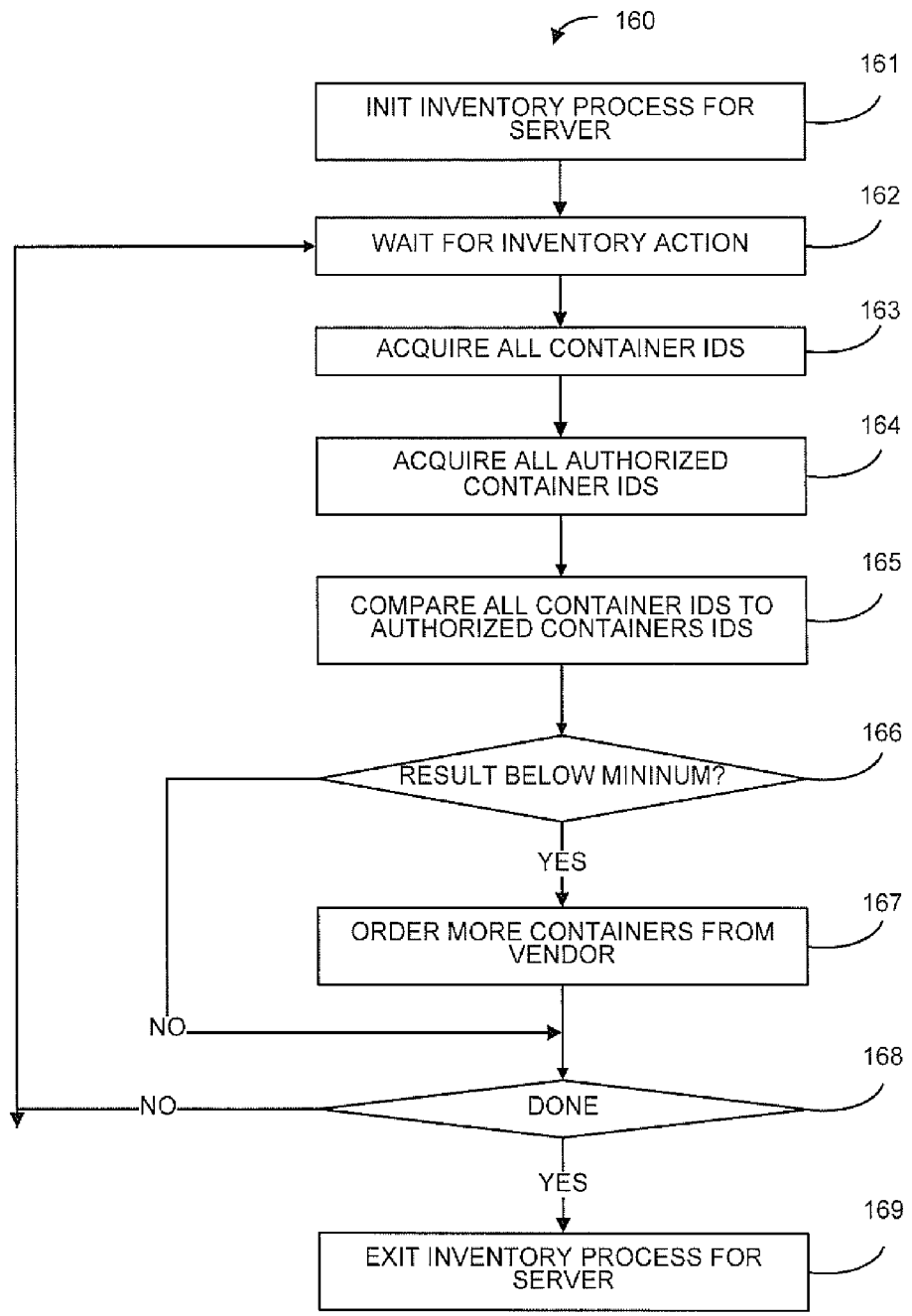
FIG. 6 is a flow chart illustrating an example of the operation of the inventory process of the pre-paid dispensing system of the present invention, as shown in FIGS. 2A & 3.

FIG. 6 is a flow chart illustrating an example of the operation of the inventory process 160 of the pre-paid dispensing system 100 on the server 10, as shown in FIGS. 2A & 3. The inventory process enables the vendor to determine how many containers are active and inactive as well as determine when the low threshold for containers is breached.

First at step 161, the inventory process 160 is initialized. This initialization includes the startup routines and processes embedded in the BIOS of the server 10. The initialization also includes the establishment of data values for particular data structures utilized in the inventory process 160.

At step 162, the inventory process 160 waits to receive an inventory action. Once an inventory action has been received, the inventory process 160 then obtains all of the container IDs registered for the vendor at step 163. The container IDs registered for the vendor are stored in database 11. Next, the inventory process 160 acquires all the authorized container IDs at step 164. The authorized container IDs are those container IDs activated during the purchase of a container by a customer.

At step 165, the inventory process 160 compares all the container IDs to the authorized container IDs to determine how many remaining containers and container IDs should be in inventory.

At step 166, the inventory process 160 determines if the number of remaining containers is less than a minimum threshold. If it is determined in step 166 that the remaining containers number is not below the minimum threshold, then the inventory process 160 steps to step 168. However, if it is determined at step 166 that the remaining containers number is below the minimum, then the inventory process 160 sends an order to the manufacturer for more containers, at step 167.

At step 168, it is determined if the inventory process 160 is to wait for additional inventory actions. If it is determined at step 168 that the inventory process 160 is to wait for additional inventory actions, then the inventory process 160 returns to repeat steps 162 through 168. However, if it is determined at step 168 that there are no more inventory actions to be received, then the inventory process 160 exits at step 169.

Figure 7:
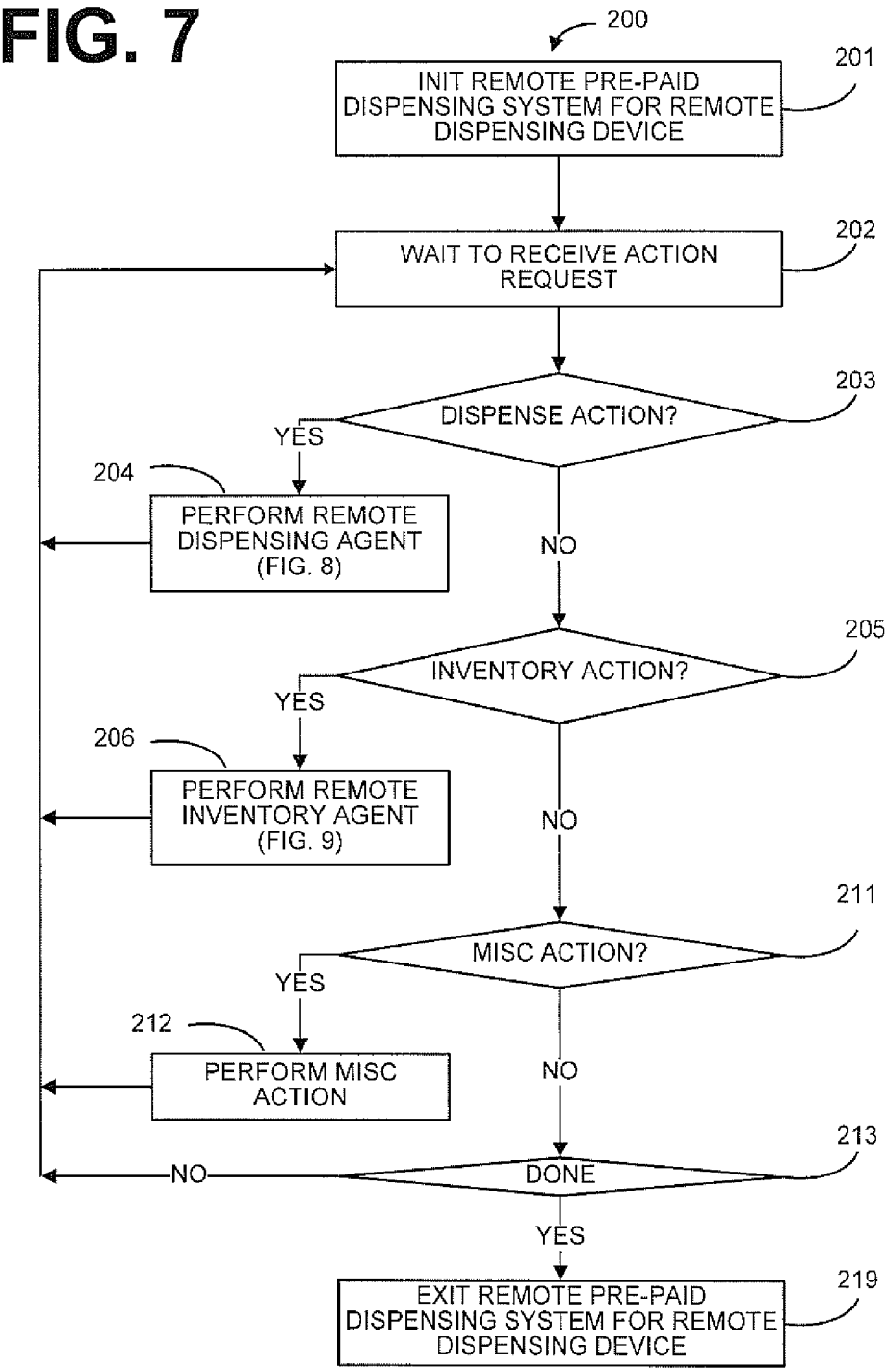
FIG. 7 is a flow chart illustrating an example of the operation of the remote pre-paid dispensing device system on the remote dispensing device, as shown in FIG. 2B.

FIG. 7 is a flow chart illustrating an example of the operation of the remote pre-paid dispensing system 200 on the remote dispensing device 20, as shown in FIGS. 2B. The remote pre-paid dispensing system 200 interacts with the pre-paid dispensing system 100 of the present invention to authenticate that a container utilized by a customer is authorized for dispensing of a selected product. The remote pre-paid dispensing system 200 uses known communication means to establish communication with the pre-paid dispensing system 100 on the server 10.

First at step 201, the remote pre-paid dispensing system 200 is initialized on the remote dispensing device 20. This initialization includes the startup routines and processes embedded in the BIOS of the remote dispensing device 20. The initialization also includes the establishment of data values for particular data structures utilized in the remote pre-paid dispensing system 200.

At step 202, the remote pre-paid dispensing system 200 waits to receive an action request. Upon receiving an action request, the remote pre-paid dispensing system 200 then determines if the action is a dispense action. If it is determined at step 203 that the action request is not a dispense action, then the remote pre-paid dispensing system 200 skips to step 205. However, if it is determined at step 203 that the action request is a dispense action, then the remote pre-paid dispensing system 200 performs the remote dispensing agent at step 204. The remote dispensing agent is herein described in further detail with regard to FIG. 8. After performing the remote dispensing agent, the remote pre-paid dispensing system 200 returns to step 202.

At step 205, it is determined if an inventory action is to occur. If it is determined that an inventory action step is not to occur, then the remote pre-paid dispensing system 200 and skips to step 211. However, if it is determined at step 205 that an inventory action is to occur, then the remote inventory agent is performed at step 206. The remote inventory agent is herein described in further detail with regard to FIG. 9. After performing the remote inventory agent, the remote pre-paid dispensing system 200 returns to step 202.

At step 211, it is determined if a miscellaneous action is to occur. If it is determined that a miscellaneous action is not to occur, then the remote pre-paid dispensing system 200 skips to step 213. However, if it is determined at step 211 that a miscellaneous action is to occur, then the miscellaneous action is performed at step 212. After performing the miscellaneous action, the remote pre-paid dispensing system 200 returns to step 202.

At step 213, it is determined if the remote pre-paid dispensing system 200 is to wait for additional actions. If it is determined at step 213 that the remote pre-paid dispensing system 200 is to wait for additional actions, then the remote pre-paid dispensing system 200 returns to repeat steps 202 through 213. However, if it is determined at step 213 that there are no more client actions to be received, then the remote pre-paid dispensing system 200 exits at step 219.

Figure 8:
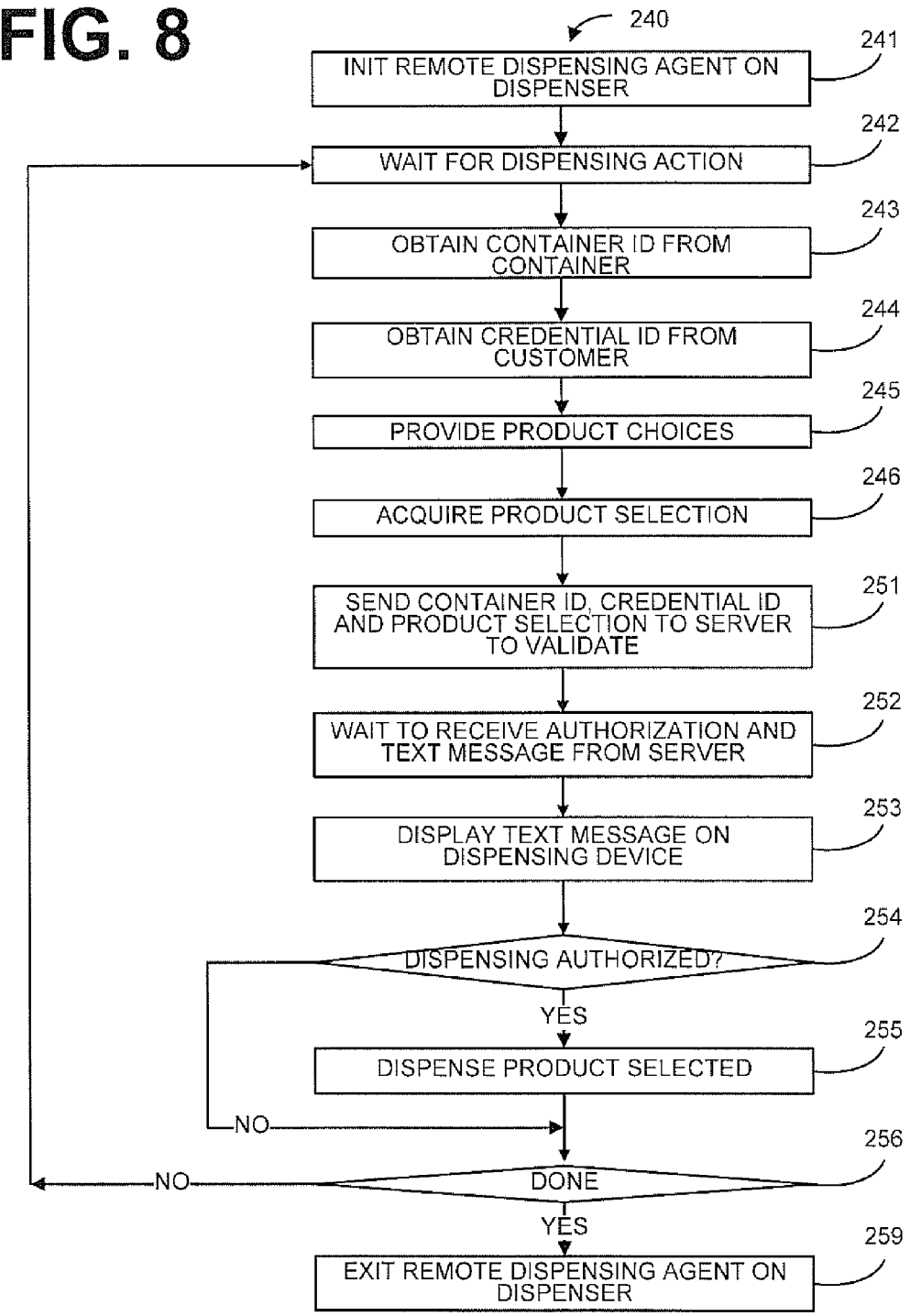
FIG. 8 is a flow chart illustrating an example of the operation of the remote dispensing agent on the remote dispensing device utilized in the pre-paid dispensing system of the present invention, as shown in FIGS. 2B and 7.

FIG. 8 is a flow chart illustrating an example of the operation of the remote dispensing agent 240 of the remote pre-paid dispensing system 200 on the remote dispensing device 20, as shown in FIGS. 2B & 7. The remote dispensing agent 240 is for dispensing pre-paid items into a uniquely identified container. The uniquely identified container, having a container ID, is validated with a uniquely identified and separate credential ID to verify the pre-payment and to authorize dispensing of the item.

First at step 241, the remote dispensing agent 240 is initialized. This initialization includes the startup routines and agents embedded in the BIOS of the server 10. The initialization also includes the establishment of data values for particular data structures utilized in the remote dispensing agent 240.

At step 242, the remote dispensing agent 240 waits to receive a dispensing action. Once a dispensing action has been received, the remote dispensing agent 240 then requests the customer to present the container at step 243, so that the remote dispensing agent 240 may obtain the container ID from the container. Container ID information, which may be permanently encoded or capable of being re-encoded, is read via a "reader" that scans the container. This scan may be for optical ID (e.g., barcode, hologram, pictogram, printed code, holes or depressions in the container), electronic ID (e.g., RFID or radio tag "chip", magnetic chip or strip), a feature in the container readable electronically (e.g., electrical resistance or capacitance), or tactile encoded ID (e.g., holes or depressions in the container, any kind of surface features such as bumps, lines, or etchings).

After obtaining the container ID, the remote dispensing agent 240 requests that the customer provide the credential ID via the credential input device at step 244. Examples of the credential ID include, but are not limited to, a biometric reading, magnetic encoding on a object, a key code that can be punched into a keypad, an optically scannable object, a digitally encoded electronic key, a mechanical item such as a key and the like. Examples of the biometric reading include, but are not limited to, a fingerprint scan, facial recognition, retinal scan, and the like. Examples of the optically scanned object include but are not limited to a card or other item with coding holes punched in it; a barcode, number or other printed identifier; a hologram; or the like.

After obtaining the credential ID from the customer, the remote dispensing agent 240 then provides the product choices to the customer, at step 245. In an alternative embodiment, the remote dispensing agent 240 can send the container ID and credential ID to the pre-paid dispensing system 100 on the server 10 to obtain the authorized product choices that can be provided to the customer for selection. In another alternative embodiment, this step is skipped and the customer is allowed to select any product dispensed (which will be validated in the next step).

At step 246, the remote dispensing agent waits to acquire the customer's product selection. After obtaining the customer's product selection at step 246, then the remote dispensing agent 240 sends a message to the pre-paid dispensing system 100 on server 10, at step 251. This message includes information regarding the container ID, credential ID, the customer's product selection and the remote dispensing device 20 location. This is to verify that all of the conditions of sale originally agreed to are in effect.

At step 252, the remote dispensing agent 240 waits to receive the authorization and text message from the pre-paid dispensing system 100 on server 10. At step 253, the remote dispensing agent 240 displays the text message on remote dispensing device 20 to the customer. This message can be a message indicating that the consumer is authorized to dispense the requested product into the authorize container. If the container is not authorized to receive the requested product, then the text message is displayed to indicate the problem and what the customer should do to resolve it. This includes directions to the nearest sales office, a request to retry the transaction because container ID/credential ID was not properly acquired and/or the like.

In one embodiment, the message comprises a flag indicating whether the transaction is valid or invalid, and a text message for display to the customer. In another embodiment, the message includes an encoded signal that indicates whether the transaction is valid or invalid and which if any predetermined text message is to be displayed to the customer.

At step 254, the remote dispensing agent determines if the dispensing action is authorized (i.e., if the container and user are authorized to receive the requested product). If it is determined at step 254 that the dispensing action was not authorized, then the remote dispensing agent 240 skips to step 256. This is after the customer is notified that the dispensing action will not take place in step 253. However, if it is determined in step 254 that the dispensing action is authorized, then the requested product is dispensed at step 255.

At step 256, it is determined if the remote dispensing agent 240 is to wait for additional dispensing actions. If it is determined at step 256 that the remote dispensing agent 240 is to wait for additional dispensing actions, then the remote dispensing agent 240 returns to repeat steps 242 through 256. However, if it is determined at step 256 that there are no more dispensing actions to be received, then the remote dispensing agent 240 exits at step 259.

Figure 9:
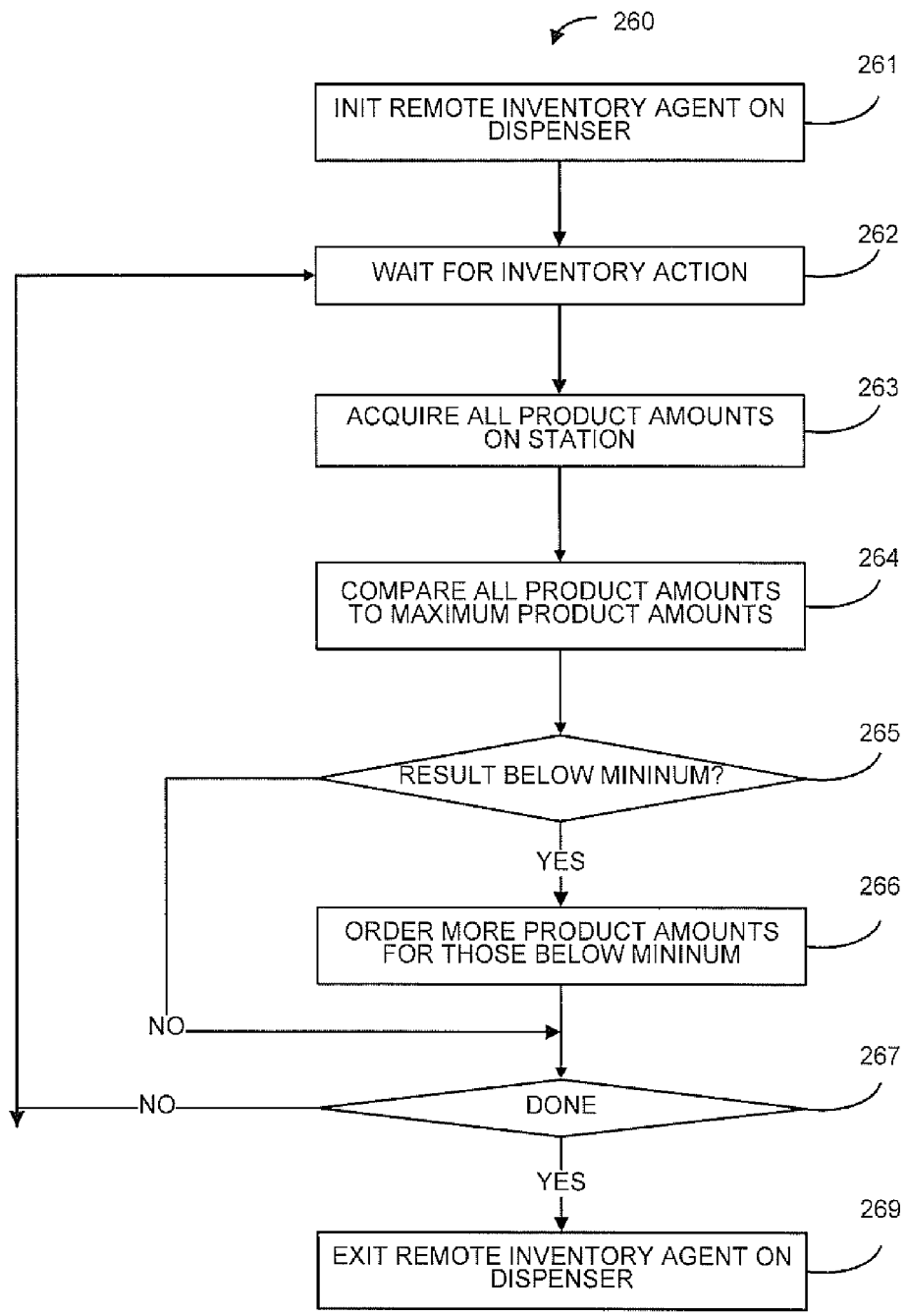
FIG. 9 is a flow chart illustrating an example of the operation of the remote inventory agent on the remote dispensing device utilized in the pre-paid dispensing system of the present invention, as shown in FIGS. 2B and 7.

FIG. 9 is a flow chart illustrating an example of the operation of the remote inventory agent 260 of the pre-paid dispensing system on the remote dispensing device, as shown in FIGS. 2B & 7. The remote inventory agent 260 enables the vendor to determine how much product is still available at the remote dispensing device 20, as well as determine when the low threshold for products is breached.

First at step 261, the remote inventory agent 260 is initialized. This initialization includes the startup routines and agents embedded in the BIOS of the server 10. The initialization also includes the establishment of data values for particular data structures utilized in the remote inventory agent 260.

At step 262, the remote inventory agent 260 waits to receive an inventory action. Once an inventory action has been received, the remote inventory agent 260 then acquires the amount of each product available at the remote dispensing device 20 at step 263. At step 264, the remote inventory agent 260 compares current product amounts to the maximum allowable product amounts for that remote dispensing device 20.

At step 265, the remote inventory agent 260 determines if the any of the current product amounts are less than a minimum threshold. If it is determined in step 265 that the none of the current product amounts are below the minimum threshold level, then the remote inventory agent 260 skips to step 267. However, if it is determined at step 265 that the at least one of the current product amounts is below the corresponding minimum threshold level, then the remote inventory agent 260 sends an order for more product for each of those current products that are below the minimum threshold level at step 267. In one embodiment, the order for more products is sent to the pre-paid dispensing system 100 on server 10 for processing. In another embodiment, the order for more products is sent directly to the third party supplier computer systems 14 to minimize human involvement.

At step 267, it is determined if the remote inventory agent 260 is to wait for additional inventory actions. If it is determined at step 267 that the remote inventory agent 260 is to wait for additional inventory actions, then the remote inventory agent 260 returns to repeat steps 262 through 267. However, if it is determined at step 267 that there are no more inventory actions to be received, then the remote inventory agent 260 exits at step 269.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for providing a pre-paid product to an authorized customer using a unique container, comprising:
   a storage medium readable by a processing circuit and storing instructions for execution by the processing circuit for providing validation of the unique container and the authorized customer;
   a sales module that acquires a container ID for the unique container and generates a credential ID for the authorized customer receiving the unique container, wherein the credential ID is related to the container ID, but is separate element carriable by the customer independently of the container, and wherein the sales module activates the unique container and stores the container ID for the unique container and the related credential ID for the authorized customer in the storage medium; and
   a dispensing module that receives a request from a remote dispensing device for validation of the unique container to receive the prepaid product, wherein the dispensing module compares a received request container ID and a received request credential ID in the request to the stored container ID and the stored credential ID in the storage medium, respectively, and authorizes the dispensing of the prepaid product only if the received request container ID matches the stored container ID and the received request credential ID and the stored credential ID, wherein the match of the request credential ID and the stored credential ID validates the authorized customer, wherein the match of the request container ID and the stored container ID validates the container, and wherein the dispensing module authorizes the dispensing of the prepaid product only if the authorized customer presents the container ID to validate the container and also presents the credential ID to validate the authorized customer.

2. The system of claim 1, wherein the container ID is embedded in the container.

3. The system of claim 2, wherein the embedded container ID is an RFID device.

4. The system of claim 1, wherein the container ID is selected from the group consisting of a barcode, hologram, pictogram, printed code, holes in the unique container, radio tag, magnetic chip or strip, electrical resistance of the unique container, capacitance of the unique container, bumps on the unique container, lines on the unique container and etchings on the unique container.

5. The system of claim 1, wherein the credential ID is selected from the group consisting of a biometric reading, magnetic encoding on an object, a key code that can be punched into a keypad, a digitally encoded electronic key, a mechanical key, a fingerprint scan, facial recognition, retinal scan, a card with coding holes punched in it, a card with barcode, a card with a number, and a card with a hologram.

6. The system of claim 1, wherein the sales module determines a plurality of products that are enabled for dispensing to the unique container as the prepaid product.

7. The system of claim 6, wherein the dispensing module further comprises a condition module that does not authorize the dispensing of the pre-paid product requested if the prepaid product requested is not one of the plurality of products enabled for dispensing to the unique container.

8. The system of claim 6, wherein the dispensing module further comprises a condition module that does not authorize the dispensing of the pre-paid product requested if a predetermined amount of time has passed since storing the container ID for the unique container and the corresponding credential ID for the authorized customer in the storage medium.

9. The system of claim 6, wherein the dispensing module further comprises a condition module that does not authorize the dispensing of the pre-paid product requested if a predetermined amount of time has not passed since a last request to receive the prepaid product requested or another of the enabled products.

10. The system of claim 1, wherein the customer can deactivate the unique container by having the container ID for the unique container removed from the storage medium.

11. A method for providing a prepaid product from a remote dispensing station, wherein the remote dispensing station receives authorization to dispense the prepaid product from a computer system in communication with the remote dispensing station, and wherein the computer system comprises a storage medium readable by a processing circuit and storing instructions for execution by the processing circuit for performing the method, the method comprising:
processing a sales transaction for a unique container having a container ID and at least one condition of sale;
generating a credential ID for the authorized customer that activates the unique container and is related to the container ID but is a separate element carriable by the customer independently of the container;
saving in the storage medium the related container ID and credential ID, along with the at least one condition of sale;
receiving a request to authorize the dispensing of the prepaid product into the container, wherein the request includes a request container ID and a request credential ID; and
enabling the remote dispensing station to dispense the requested prepaid product into the container only if the request container ID matches the stored container ID in the storage medium to validate the container and the request credential ID matches the stored credential ID in the storage medium related to the container ID to validate the authorized customer, and wherein the dispensing module authorizes the dispensing of the prepaid product only if the authorized customer presents the container ID to validate the container and also presents the credential ID to validate the authorized customer.

12. The method of claim 11, wherein the container ID is embedded in the container.

13. The method of claim 11, further comprising disabling the remote dispensing station from dispensing the requested prepaid product into the container if the prepaid product requested is not defined in the at least one condition of sale as one of the plurality of products enabled for dispensing to the container.

14. The method of claim 11, further comprising disabling the remote dispensing station from dispensing the requested prepaid product into the container if a time period between each dispensing of the prepaid product into the container is less than a minimum time period defined in the at least one condition of sale.

15. The method of claim 11, further comprising disabling the remote dispensing station from dispensing the requested prepaid product into the container product if a time period between each dispensing of the prepaid product into the container is more than a maximum time period defined in the at least one condition of sale.

16. The method of claim 11, wherein the at least one condition of sale is a maximum time period after the purchase to dispense the prepaid product into the container.

17. A remote dispensing station for use by an authorized customer with a unique container, the remote dispensing station comprising:
a storage medium readable by a processing circuit and storing instructions for execution by the processing circuit for providing validation of the unique container and the authorized customer;
a plurality of products to be provided to the authorized customer;
a container ID reader that acquires a request container ID of the unique container;
a credential ID reader that acquires a request credential ID provided by the authorized customer, wherein the credential ID is related to the container ID but is a separate element carriable by the customer independently of the container;
a transceiver for transmitting the request credential ID and the request container ID to a remote data system in a request for an authorization to dispense one of the plurality of products and for receiving a response to the request, wherein the response includes the authorization only if the request container ID matches a stored container ID in the storage medium to validate the container and the request credential ID matches a stored credential ID in the storage medium related to the container ID to validate the authorized customer, and wherein the response includes the authorization only if the authorized customer presents the container ID to the container ID reader to validate the container and also presents the credential ID to credential ID reader to validate the authorized customer; and
a dispenser to dispense one of the plurality of products into the unique container if the response to the request includes the authorization to dispense one of the plurality of products.

18. The remote dispensing station of claim 17, wherein the container ID reader further comprises an electrical ID reader for receiving an electrical signal emanating from the container.

19. The remote dispensing station of claim 18, wherein the electrical signal emanating from the container is an RFID signal.

20. The remote dispensing station of claim 17, wherein the container ID reader further comprises an optical ID reader for scanning data on the container.

21. The remote dispensing station of claim 20, wherein the credential ID reader further comprises a biometric scanner.

22. The remote dispensing station of claim 21, wherein the biometric scanner is a fingerprint scanner.

23. The remote dispensing station of claim 17, wherein the credential ID reader further comprises a keypad to input a key code.

24. The remote dispensing station of claim 17, wherein the credential ID reader further comprises an optical ID reader for scanning an optically scannable object.

25. The remote dispensing station of claim 24, wherein the optically scannable object is a printed card and the optical ID reader scans the printed card.

* * * * *